(12) United States Patent
Shibuya

(10) Patent No.: US 6,185,647 B1
(45) Date of Patent: Feb. 6, 2001

(54) DYNAMIC BUS CONTROL APPARATUS FOR OPTIMIZED DEVICE CONNECTION

(75) Inventor: Keiko Shibuya, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/078,442

(22) Filed: May 14, 1998

(30) Foreign Application Priority Data

Dec. 18, 1997 (JP) .................................................. 9-348889

(51) Int. Cl.⁷ .................................................. G06F 13/00
(52) U.S. Cl. .......................... 710/107; 710/115; 710/116; 710/122; 710/123; 710/243
(58) Field of Search .................................. 710/107, 115, 710/114, 116, 118, 121, 122, 123, 125, 126, 243, 244; 364/240, 240.3, 242.8

(56) References Cited

U.S. PATENT DOCUMENTS

| | | | |
|---|---|---|---|
| 4,511,960 | * 4/1985 | Boudreau | 711/219 |
| 4,750,177 | * 6/1988 | Hendrie et al. | 714/748 |
| 4,914,580 | * 4/1990 | Jensen et al. | 710/265 |
| 4,926,419 | * 5/1990 | Whipple | 370/85.6 |
| 5,745,670 | * 4/1998 | Linde | 714/4 |
| 5,754,877 | * 5/1998 | Hagersten et al. | 712/29 |

FOREIGN PATENT DOCUMENTS 54-137941  10/1979  (JP) .
63-71760   4/1988   (JP) .

* cited by examiner

Primary Examiner—Ario Etienne
(74) Attorney, Agent, or Firm—Staas & Halsey LLP (57) ABSTRACT

A priority decision circuit decides priorities of a plurality of slots on the basis of access frequencies or the like. In conformity with these priorities, a bus mapping circuit performs mapping allowing a slot having a higher priority to be connected to the upper hierarchical bus whereas it performs mapping allowing a slot having a lower priority to be connected to the lower hierarchical bus.

15 Claims, 7 Drawing Sheets

| MODE No. | ARBITRATION SIGNAL<br>1: ACCESS NUMBER-OF-TIMES THRESHOLD OR MORE<br>0: LESS THAN ACCESS NUMBER-OF-TIMES THRESHOLD | | | | BUS MAPPING SIGNAL<br>1: CONNECT BUS 16<br>0: CONNECT BUS 18 | | | |
|---|---|---|---|---|---|---|---|---|
| | E11 | E21 | E31 | E41 | E12 | E22 | E32 | E42 |
| 0 | 0 | 0 | 0 | 0 | 1 | 1 | 0 | 0 |
| 1 | 0 | 0 | 0 | 1 | 1 | 0 | 0 | 1 |
| 2 | 0 | 0 | 1 | 0 | 1 | 0 | 1 | 0 |
| 3 | 0 | 0 | 1 | 1 | 0 | 0 | 1 | 1 |
| 4 | 0 | 1 | 0 | 0 | 1 | 1 | 0 | 0 |
| 5 | 0 | 1 | 0 | 1 | 0 | 1 | 0 | 1 |
| 6 | 0 | 1 | 1 | 0 | 0 | 1 | 1 | 0 |
| 7 | 0 | 1 | 1 | 1 | 0 | 1 | 1 | 0 |
| 8 | 1 | 0 | 0 | 0 | 1 | 1 | 0 | 0 |
| 9 | 1 | 0 | 0 | 1 | 1 | 0 | 0 | 1 |
| 10 | 1 | 0 | 1 | 0 | 1 | 0 | 1 | 0 |
| 11 | 1 | 0 | 1 | 1 | 1 | 0 | 1 | 0 |
| 12 | 1 | 1 | 0 | 0 | 1 | 0 | 1 | 0 |
| 13 | 1 | 1 | 0 | 1 | 1 | 1 | 0 | 0 |
| 14 | 1 | 1 | 1 | 0 | 1 | 1 | 0 | 0 |
| 15 | 1 | 1 | 1 | 1 | 1 | 1 | 0 | 0 |

| MODE No. | ARBITRATION SIGNAL<br>1: ACCESS NUMBER-OF-TIMES THRESHOLD OR MORE<br>0: LESS THAN ACCESS NUMBER-OF-TIMES THRESHOLD | | | | BUS MAPPING SIGNAL<br>00: FIRST SLOT POSITION<br>01: SECOND SLOT POSITION<br>10: THIRD SLOT POSITION<br>11: FOURTH SLOT POSITION | | | |
|---|---|---|---|---|---|---|---|---|
| | E11 | E21 | E31 | E41 | E13 | E23 | E33 | E43 |
| 0 | 0 | 0 | 0 | 0 | 00 | 01 | 10 | 11 |
| 1 | 0 | 0 | 0 | 1 | 01 | 10 | 11 | 00 |
| 2 | 0 | 0 | 1 | 0 | 01 | 10 | 00 | 11 |
| 3 | 0 | 0 | 1 | 1 | 10 | 11 | 00 | 01 |
| 4 | 0 | 1 | 0 | 0 | 01 | 00 | 10 | 11 |
| 5 | 0 | 1 | 0 | 1 | 10 | 00 | 11 | 01 |
| 6 | 0 | 1 | 1 | 0 | 10 | 00 | 01 | 11 |
| 7 | 0 | 1 | 1 | 1 | 11 | 00 | 01 | 10 |
| 8 | 1 | 0 | 0 | 0 | 00 | 01 | 10 | 11 |
| 9 | 1 | 0 | 0 | 1 | 00 | 10 | 11 | 01 |
| 10 | 1 | 0 | 1 | 0 | 00 | 10 | 01 | 11 |
| 11 | 1 | 0 | 1 | 1 | 00 | 11 | 01 | 10 |
| 12 | 1 | 1 | 0 | 0 | 00 | 01 | 10 | 11 |
| 13 | 1 | 1 | 0 | 1 | 00 | 01 | 10 | 11 |
| 14 | 1 | 1 | 1 | 0 | 00 | 01 | 10 | 11 |
| 15 | 1 | 1 | 1 | 1 | 00 | 01 | 10 | 11 |

DYNAMIC BUS CONTROL APPARATUS FOR OPTIMIZED DEVICE CONNECTION

BACKGROUND OF THE INVENTION

1. Field of the Invention

The present invention relates generally to a bus control apparatus for use in information processing apparatus such as a personal computer, a work station, an office computer, etc., and more particularly to a bus control apparatus for optimizing the connection positions of slots through which devices are connected to a bus.

2. Description of the Related Art

Recent information processing apparatus tends to include more and more devices in the form of peripheral units such as a storage unit and an input/output unit to be connected to buses, due to the increase in type of the devices. However, the number of devices connectable to a single bus is electrically restricted, so that the bus is divided so as to have a hierarchical structure. More specifically, an upper hierarchical device bus is connected via a host bridge to a host bus connecting to a host, with a lower hierarchical device bus being connected via a bus bridge to the upper hierarchical device bus, to thereby constitute a hierarchical bus allowing the devices such as the storage unit, the input/output unit, etc., to be connected to a plurality of slots provided on the upper and lower hierarchical buses. In the case of such a conventional hierarchical bus, the positions of the slots for connecting the peripheral units to the respective hierarchical buses are fixedly mapped. For this reason, in the case where the host accesses a device connected to a slot on the lower hierarchical bus, processing time will be elongated since the access is effected from the upper hierarchical bus through the bus bridge to the lower hierarchical bus. Thus, in the case of structuring a hierarchical bus, the devices are fixedly mapped taking into consideration the upper hierarchical bus having a short access time and the lower hierarchical bus having a long access time. However, the states of the access to the devices vary depending on the applications executed by the host. Some processing may incur a concentration of accesses to the device mapped to the lower hierarchical bus, with the result that elongation of the access time may possibly lead to a low processing performance.

On the contrary, even in the case of an ordinary bus having no hierarchical structure, an electrical characteristic, for instance, a delay time of the access from the host differs depending on the positions of connections of the slots to the bus. As a result of this, a plurality of devices connected to the same bus also have different access time depending on their bus connecting positions. For this reason, in case accesses are concentrated to the device connected to the position having an insufficient electrical characteristic, the access time may be increased or an error attributable to an electrical fault may occur, which requires a retry for recovery, resulting in a lower processing performance as a whole.

SUMMARY OF THE INVENTION

According to the present invention, there is provided a bus control apparatus for adding to the speed of transfer on a bus having a hierarchical structure.

The present invention is directed to a bus control apparatus for a hierarchical bus, comprising a hierarchical bus connected to a host apparatus and consisting at least of an upper hierarchical bus and a lower hierarchical bus, a plurality of slots selectively connectable to the hierarchical bus in order to connect a device receiving an input/output demand from the host apparatus; a priority decision circuit for deciding priorities of the plurality of slots; and a bus mapping circuit for connecting each of the plurality of slots to the hierarchical bus to allow an execution of processing in response to an access demand from the host apparatus on the basis of the priorities determined by the priority decision circuit. In this case, the priority decision circuit decides the priorities on the basis of the frequencies of access of the host apparatus to devices connected to the plurality of slots. That is, the bus mapping circuit has an access counter which counts up the number of times of access of the host apparatus to the devices connected to the plurality of slots at a specified interval, and the priority decision circuit sets priorities of the slots in descending order of access number of times counted up by the access counter. At the start of use of the apparatus by the power on, the priority decision circuit assigns previously defined priorities to the plurality of slots whereas in use it assigns the priorities to the slots in descending order of the number of times of access of the host apparatus to the devices connected to the plurality of slots which are counted up by the access counter at a specified interval. Furthermore, the bus mapping circuit allows a non-volatile memory unit to store at the time of power off the priorities of the plurality of slots determined by the priority decision circuit, and the bus mapping circuit reads out the priorities stored in the non-volatile memory unit at the start of use by the next power on, to thereby perform initialization. When the priority decision circuit recognizes an unused slot which is not connected to the device among said plurality of slots, it assigns the lowest priority to said unused slot. The bus mapping circuit performs mapping allowing a slot having a higher priority to be connected to the upper hierarchical bus whereas it performs mapping allowing a slot having a lower priority to be connected to the lower hierarchical bus. According to such a bus control apparatus of the present invention, in case the upper hierarchical bus includes any slots having no access from the upper hierarchical bus and the lower hierarchical bus includes any slots having frequent accesses from the lower hierarchical bus, the bus connection is again mapped so that more frequently accessed lower hierarchical bus slot is turned to the upper hierarchical bus, thereby eliminating the access via the bus bridge to shorten the access path, making it possible to add to the bus access speed.

It is another object of the present invention to provide a bus control apparatus for increasing the speed of transfer on an ordinary bus having no hierarchical structure. This bus control apparatus comprises a bus connected to a host apparatus; a plurality of slots selectively connectable to buses for connecting devices receiving an input/output demand from the host apparatus; a plurality of slot connection positions provided on the buses for connecting a plurality of slots having priorities set in the descending order of the electrical characteristics with the host apparatus; a priority decision circuit for determining the priorities of the plurality of slots; and a bus mapping circuit for connecting each of the plurality of slots to the slot connection positions on the buses on the basis of the priorities determined by the priority decision circuit to thereby allow the execution of processing in response to the access demand from the host apparatus. The detail of the priority decision circuit in this case is the same as that of the case using the hierarchical bus and is provided with the access counter and the non-volatile memory. The bus mapping circuit performs mapping allowing a slot having a higher priority to be connected to a slot connection point having a higher priority whereas it performs mapping allowing a slot having a lower priority to be connected to a slot connection point having a lower priority. According to the bus control apparatus of the present invention, in case a frequently accessed slot lies in a bus connection position having a relatively low electric characteristic, the frequently accessed slot is again mapped to another slot connection position on the bus having a superior bus electric characteristic, so that the electric characteristic is improved to for instance shorten the delay time, making it possible to increase the bus access speed.

The above and other objects, features and advantages of the present invention will become more apparent from the following detailed description with reference to the accompanying drawings.

DETAILED DESCRIPTION OF THE PREFERRED EMBODIMENTS

Figure 1:
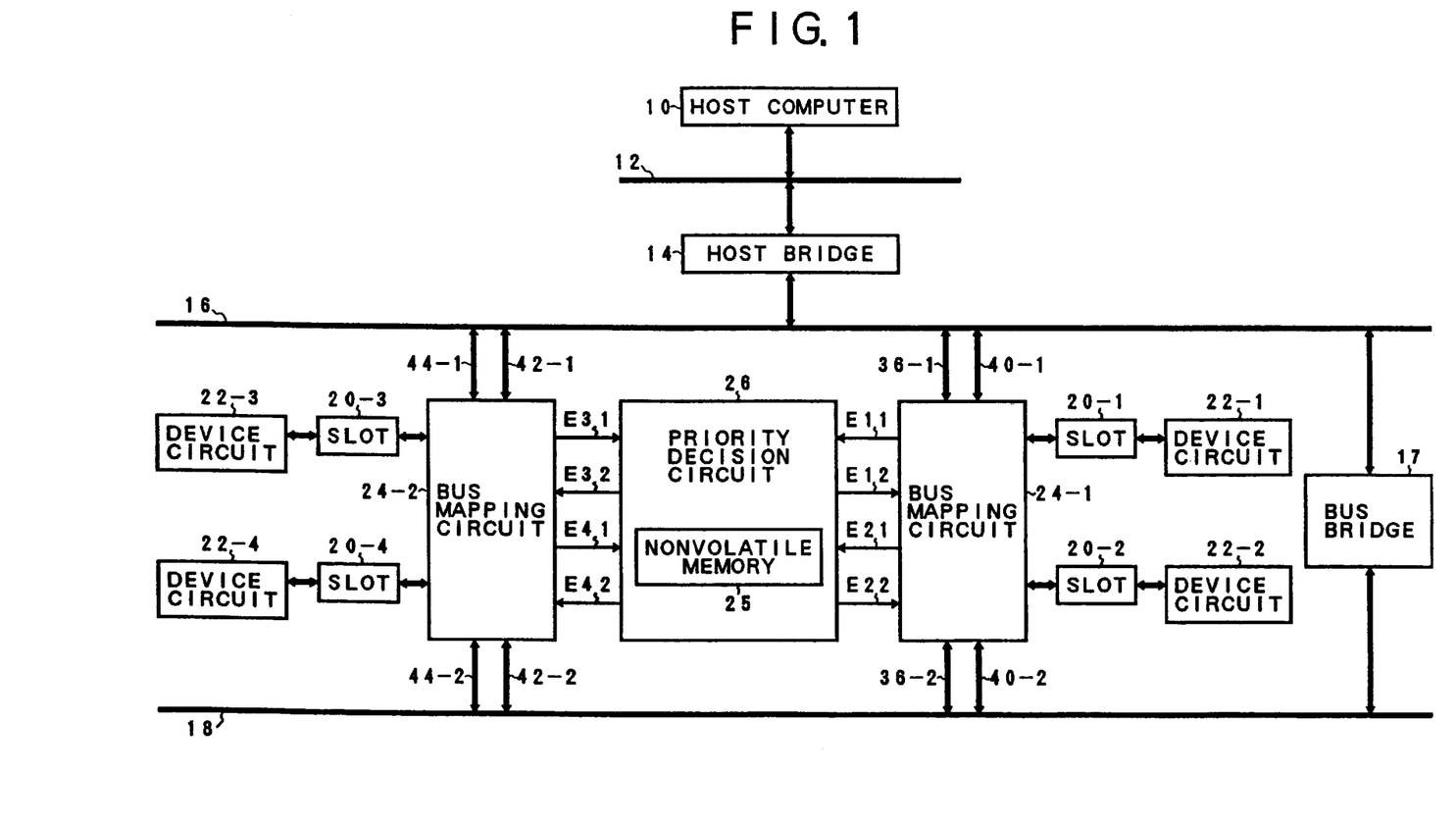
FIG. 1 is a circuit block diagram of a bus control apparatus for a hierarchical bus in accordance with the present invention.

FIG. 1 is a circuit block diagram of an embodiment of a bus control apparatus intended for a hierarchical bus in accordance with the present invention. A host computer 10 has a host bus 12 to which is connected via a host bridge 14 an upper hierarchical bus 16 within the hierarchical bus which is the object of the present invention. A lower hierarchical bus 18 is connected via a bus bridge 17 to the upper hierarchical bus 16. In this embodiment, the upper hierarchical bus 16 and the lower hierarchical bus 18 are each provided for example with four slots. Thus, the slots connectable to the upper hierarchical bus 16 and the lower hierarchical bus 18 are provided in the form of slots 20-1, 20-2, 20-3 and 20-4 in this embodiment which are associated respectively with device circuits 22-1, 22-2, 22-3 and 22-4. The device circuits 22-1 to 22-4 can be storage devices such as a hard disk drive, an optical disk drive, a floppy disk drive, etc., or any input/output devices such as a keyboard, a printer, a communication modem, etc. The slots 20-1 and 20-2 are allowed to be connected via a bus mapping circuit 24-1 to either the upper hierarchical bus 16 or the lower hierarchical bus 18. Similarly, the slots 20-3 and 20-4 are allowed to be connected via a bus mapping circuit 24-2 to either the upper hierarchical bus 16 or the lower hierarchical bus 18. The bus mapping circuit 24-1 is provided with branch buses 36-1 and 40-1 for the connection to the upper hierarchical bus 16 and with branch buses 36-2 and 40-2 for the connection to the lower hierarchical bus 18. The bus mapping circuit 24-2 is provided with branch buses 42-1 and 44-1 for the connection to the upper hierarchical bus 16 and with branch buses 42-2 and 44-2 for the connection to the lower hierarchical bus 18. The bus mapping circuits 24-1 and 24-2 are under the control of a priority decision circuit 26. The priority decision circuit 26 decides the priority for judging whether the slots 20-1 to 20-4 are to be connected to the upper hierarchical bus 16 or to the lower hierarchical bus 18. An algorithm for deciding the priority by the priority decision circuit 26 includes counting over a specified period of time the number of accesses of the host computer 10 to the device circuits 22-1 to 22-4 connected to the slots 20-1 to 20-4. The priority decision circuit 26, setting a higher priority when the number of accesses is equal to or more than a predetermined threshold value and setting a lower priority when the number of times of access is less than the predetermined threshold value. The bus mapping circuits 24-1 and 24-2 are informed set for priorities of the slots 20-1 to 20-4 by the priority decision circuit 26, to map the connections to the upper hierarchical bus 16 and to the lower hierarchical bus 18 in conformity with the thus decided priorities. More specifically, regarding slots 20-1 to 20-4, the bus mapping circuits 24-1 and 24-2 provide arbitration signals E11, E21, E31 and E41 to the priority decision circuit 26 indicating the number of times the frequency of access is equal to or more than a threshold value or less than the threshold value. That is, as will become clear from the following description, the arbitration signals E11 to E41 have a logical level 1 when the frequency of access over a specified period of time counted by access counters provided in the bus mapping circuit 24-1 and 24-2 is equal to or more than a threshold value, but have a logical level 0 when the aforementioned frequency of access is less than a threshold value. The priority decision circuit 26 receives the bus arbitration signals E11 to E41 indicative of the frequency of access to the slots 20-1 to 20-4, and provides bus mapping signals E12, E22, E32 and E42 to the bus mapping circuits 24-1 and 24-2 allowing bus mapping for connecting a slot having more accesses to the upper hierarchical bus 16 but providing bus mapping for connecting a slot having a smaller number of accesses to the lower hierarchical bus 18, thereby creating the states of connection of the slots 20-1 to 20-4 to the upper hierarchical bus 16 and the lower hierarchical bus 18.

Figure 2:
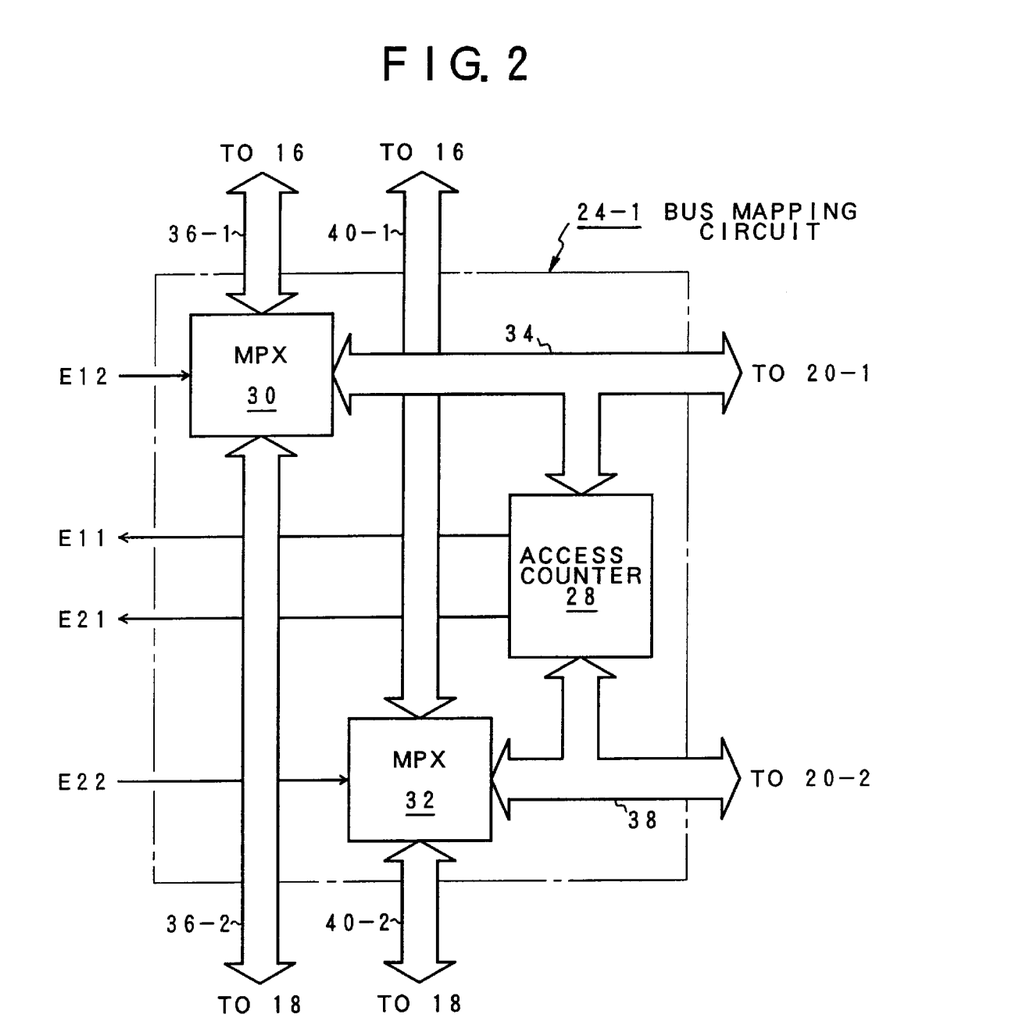
FIG. 2 is a circuit block diagram of a bus mapping circuit of FIG. 1.

FIG. 2 is a circuit block diagram of the bus mapping circuit 24-1 associated with the slots 20-1 and 20-2 of FIG. 1. The bus mapping circuit 24-1 is provided with an access counter 28 and multiplexers 30 and 32. The access counter 28 is connected to slot connection buses 34 and 38 associated with the slots 20-1 and 20-2, respectively, so the access counter 28 counts up the number of accesses of the host computer 10 to the device circuits 22-1 and 22-2 connected to the slots 20-1 and 20-2 for each specified period of time. Then, the counter 28 compares the access number of access counted for the slots 20-1 and 20-2 at the timing of the completion of a specified period of time with a previously defined threshold value. The access counter 28 sets the logical level of the arbitration signals E11 and E21 issued to the priority decision circuit 26 to 1 if the access count is equal to or more than the threshold value, but to 0 if the access count is less than the threshold value. The multiplexer 30 serves to switchably connect the slot connection bus 34 associated with the slot 20-1 to the branch bus 36-1 associated with the upper hierarchical bus 16 or to the branch bus 36-2 associated with the lower hierarchical bus 18. More specifically, the multiplexer 30 connects the slot connection bus 34 associated with the slot 20-1 to the branch bus 36-1 associated with the upper hierarchical bus 16 when the logic level of the bus mapping signal E12 from the priority decision circuit 26 is 1, whereas it connects the slot connection bus 34 associated with the slot 20-1 to the branch bus 36-2 associated with the lower hierarchical bus 18 when the logic level of the bus mapping signal E12 is 0. The multiplexer 32 is switched to connect the slot connection bus 38 associated with the slot 20-2 to the branch bus 40-1 associated with the upper hierarchical bus 16 when the logical level of the bus mapping signal E22 from the priority decision circuit 26 is 1, whereas The multiplexer 32 is switched to connect the slot connection bus 38 associated with the slot 20-2 to the branch bus 40-2 associated with the lower hierarchical bus 18 when the logical level of the bus mapping signal E22 is 0.

Figure 3:
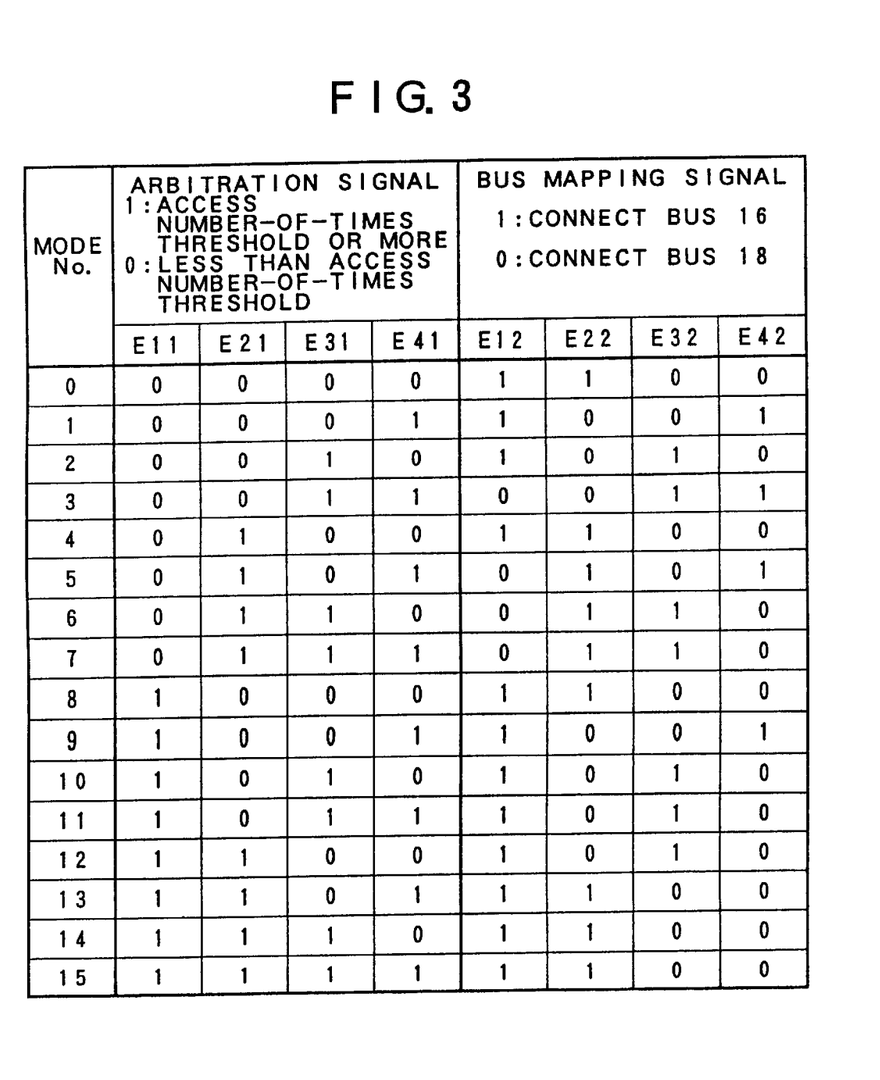
FIG. 3 is an explanatory diagram of a bus mapping signal to be fed in response to the input of an arbitration signal indicative of an access frequency in a priority decision circuit of FIG. 1.

FIG. 3 is a logical table of input/output relationship between the arbitration signals E11 to E41 indicative of the number of of accesses to the slots 20-1 to 20-4 imparted from the bus mapping circuits 24-1 and 24-2 to the priority decision circuit 26 of FIG. 1 and the bus mapping signals E12 to E42 imparted from the priority decision circuit 26 to the bus mapping circuits 24-1 and 24-2. In this logical table, 16 modes of mode Nos. 0 to 15 are assigned to 4-bit input information consisting of the arbitration signals E11 to E41 having the logical level 1 when the access number of accesses is equal to or more than a threshold value but having the logical level 0 when it is less than the threshold value. The mode No. 0 indicates a case where the arbitration signals E11 to E41 result in 0000 since the number of accesses to all the slots is less than the threshold value, which occurs at the initial state where the apparatus has been activated to first start the use. In the case of the mode No. 0 indicative of the initial state, the bus mapping signals E12 to E42 result in 1100, which are default bus mapping signals determining the initial relationship of the slot connections. This means that the slots 20-1 and 20-2 of FIG. 1 are connected by the bus mapping circuit 24-1 to the upper hierarchical bus 16 whereas the slots 20-3 and 20-4 are connected by the bus mapping circuit 24-2 to the lower hierarchical bus 18. If the use of the apparatus is started in the connection states of the slots 20-1 to 20-4 in conformity with the default 1100 of the bus mapping signals E12 to E42 in such an initial state, then for example the number of accesses to the slot 20-4 may be equal to or more than the threshold value as in the mode No. 0 for example after the elapse of a specified period of time depending on the state of accesses of the host computer 10 to the device circuit 22-1 to 22-4 connected to the slot 20-4, whereupon the arbitration signal E14 results in 1, allowing the arbitration signals E11 to E41 to result in 0001. In consequence, the priority decision circuit 26, upon the input of the arbitration signals E11 to E41 sets the bus mapping signals E12 to E42 imparted to the bus mapping circuits 24-1 and 24-2 to 1001 in conformity with the logical table of FIG. 3. That is, since the number of times of access to the slot 20-4 hitherto connected to the lower hierarchical bus 18 has exceeded the threshold value, a bus mapping is effected so as to connect the slot 20-4 to the upper hierarchical bus 16. Another bus mapping is simultaneously effected so as to connect the slot 20-2 hitherto connected to the upper hierarchical bus 16 to the lower hierarchical bus 18. Afterwards, in the same manner, a four bits of information is output as bus mapping signals E12 to E42 corresponding to the four-bit information of arbitration signals E11 to E41 of any one of the mode Nos. 0 to 15 on the basis of the counted number of accesses to the slots 20-1 to 20-4 during every specified period of time, thereby dynamically effecting the bus mapping in which the slot having a greater number of accesses is always connected to the upper hierarchical bus 16, whereas the slot having a smaller number of accesses is always connected to the lower hierarchical bus 18.

Although in the embodiment of FIG. 1 the device circuits 22-1 to 22-4 are connected to all the slots 20-1 to 20-4, if there is an unused slot having no connection with the device circuit, then the arbitration signal from that slot is always fixed to 0, and in the bus mapping circuits 24-1 and 24-2 a mapping is fixedly effected so as to allow a constant connection with the bus corresponding to the lowest priority, that is, with the lower hierarchical bus 18. Furthermore, the non-volatile memory is provided in the priority decision circuit 26 as shown in FIG. 1 so that upon the log-off processing action for removing the power of the apparatus it stores the four-bit information of the bus mapping signals E12 to E42 at that time to thereby hold the bus mapping information in spite of the disconnection of the power. Then, upon the next power on of the apparatus, the bus mapping signals at the time of the power off stored and held in the non-volatile memory 25 are read out for the initialization processing of the bus mapping by means of the bus mapping circuits 24-1 and 24-2. This enables the priority in conformity with thes number of accesses before the most recent disconnection of power to be taken over upon the power on during the operation of the apparatus, thereby providing a more appropriate switching of connection of the slots to the hierarchical buses.

Figure 4:
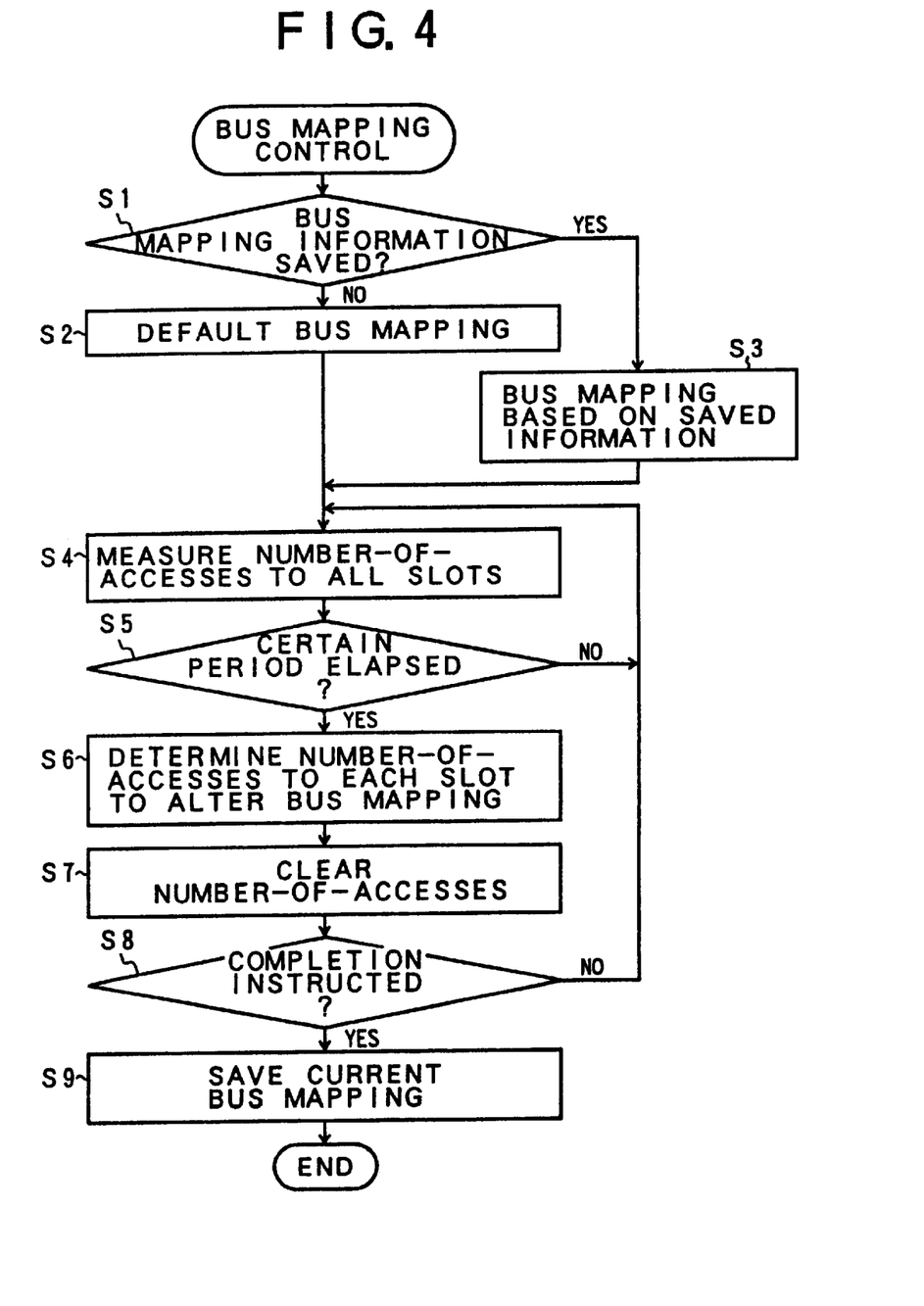
FIG. 4 is a flowchart of a bus control in accordance with the embodiment of FIG. 1.

FIG. 4 is a flowchart of a bus mapping control for the hierarchical buses of FIG. 1. First in step S1, a check is made to see if the non-volatile memory 25 retains the bus mapping information, and if no such retained information is found the procedure goes to step S2 to perform the default bus mapping; that is, the bus mapping of the slots 20-1 to 20-4 in conformity with the bus mapping signals E12 to E42= 1100 indicated at the mode No. 0 of FIG. 3. If the non-volatile memory 25 retains the bus mapping information, then in step S3 a bus mapping is carried out on the basis of the retained bus mapping information. Then in step S4 the measurements of the number of times of access to all the slots 20-1 to 20-4 are initiated, and in step S5 it is determined whether specified period of time has elapsed. If so, the procedure advances to step S6 to determined the number of times of access on a slot-by-slot basis to thereby change the bus mapping. For example, the number of accesses are compared with the previously defined threshold value, and if the access number is equal to or more than the threshold value, the bus arbitration signal imparted to the priority decision circuit 26 is set to 1 whereas if it is less than the threshold value, the bus arbitration signal is set to 0 so that the bus mapping of the slots 20-1 to 20-4 is changed by the output of the bus mapping signals E12–E42 in conformity with the logical table of FIG. 3. After the completion of the bus mapping, the number of accesses is cleared in step S7, and if no completion instruction is issued in step S8, the procedure goes back to step S4 to measure the number of accesses to all the slots in the next specified period of time. Then, if it is determined in step S8 that a completion instruction has been issued on the basis of a log off operation for the connection of power during the use of the apparatus, the procedure goes to step S9 to retain the current bus mapping information into the non-volatile memory 25 to complete a series of processing. This bus mapping information stored in the non-volatile memory 25 is read out in the processing of FIGS. S1 and S3 at the time of the initialization upon the next power on, in order to be again utilized for the initialization setting of the bus mapping.

Figure 5:
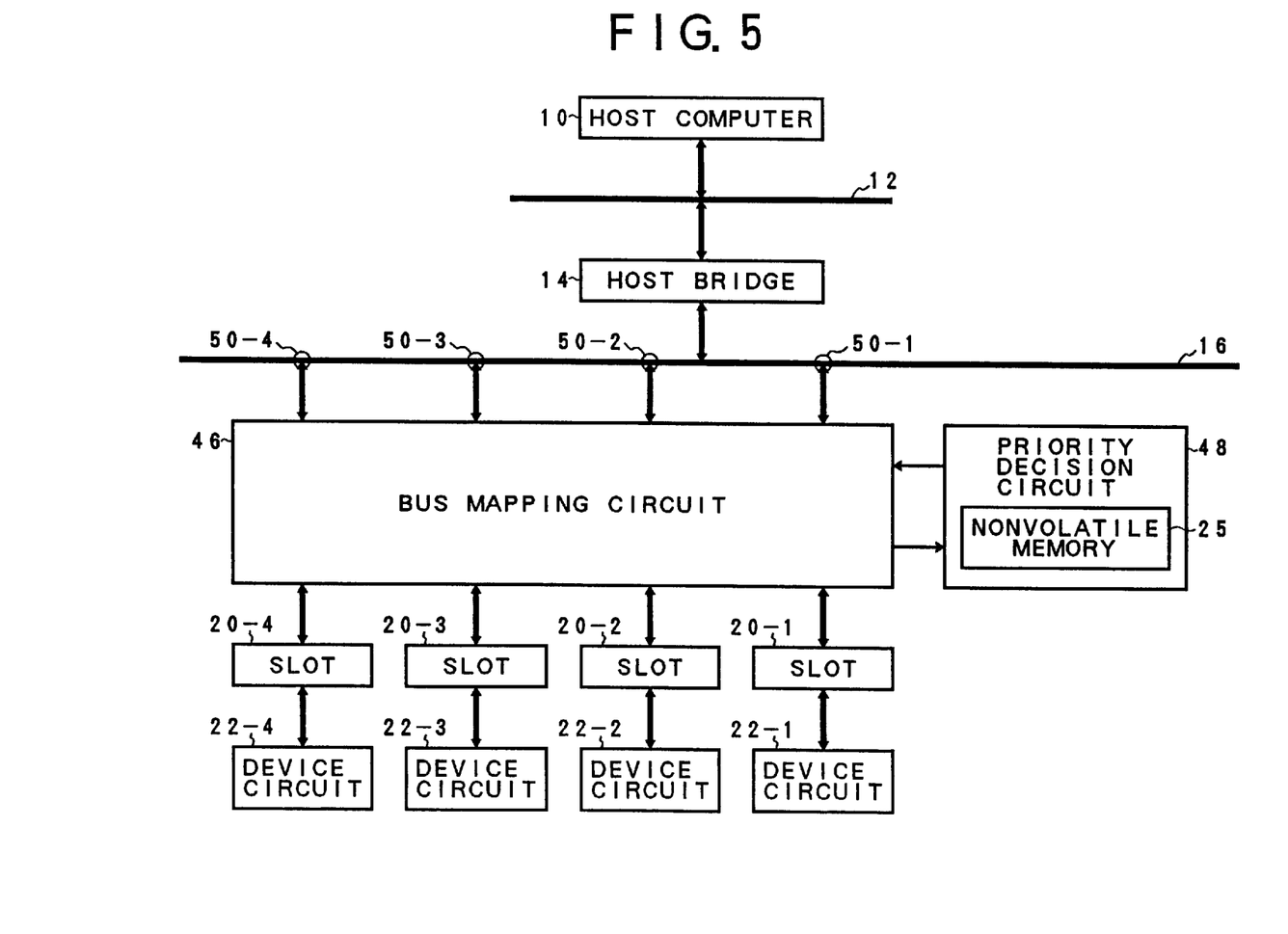
FIG. 5 is a circuit block diagram of the embodiment of the present invention for mapping the positions of connections of slots to a single bus.

FIG. 5 illustrates another embodiment of a bus control apparatus in accordance with the present invention. This embodiment is characterized in that the bus mapping is effected through the switching of the positions of connections of a plurality of slots to the same bus on the basis of the priority of each slot. The bus 16 is connected via the host bridge 14 to the host bus 12 of the host computer 10 and is provided with exemplary slot connection positions 50-1, 50-2, 50-3 and 50-4 so as to allow four slots 20-1 to 20-4 to be selectively connected via a bus mapping circuit 46 in this embodiment. The device circuits 22-1 to 22-4 are connected to the slots 20-1 to 20-4, respectively. The bus mapping circuit 46 is associated with a priority decision circuit 48 provided with the non-volatile memory 25, the priority decision circuit 48 serving to receive arbitration signals E11 to E41 based on the result of comparison with the threshold value of the access number of times counted up for each slot 20-1 to 20-4 by the bus mapping circuit 46 and to issue bus mapping signals E13 to E43 in conformity with a previously defined logical table; shown in FIG. 7.

Figure 6:
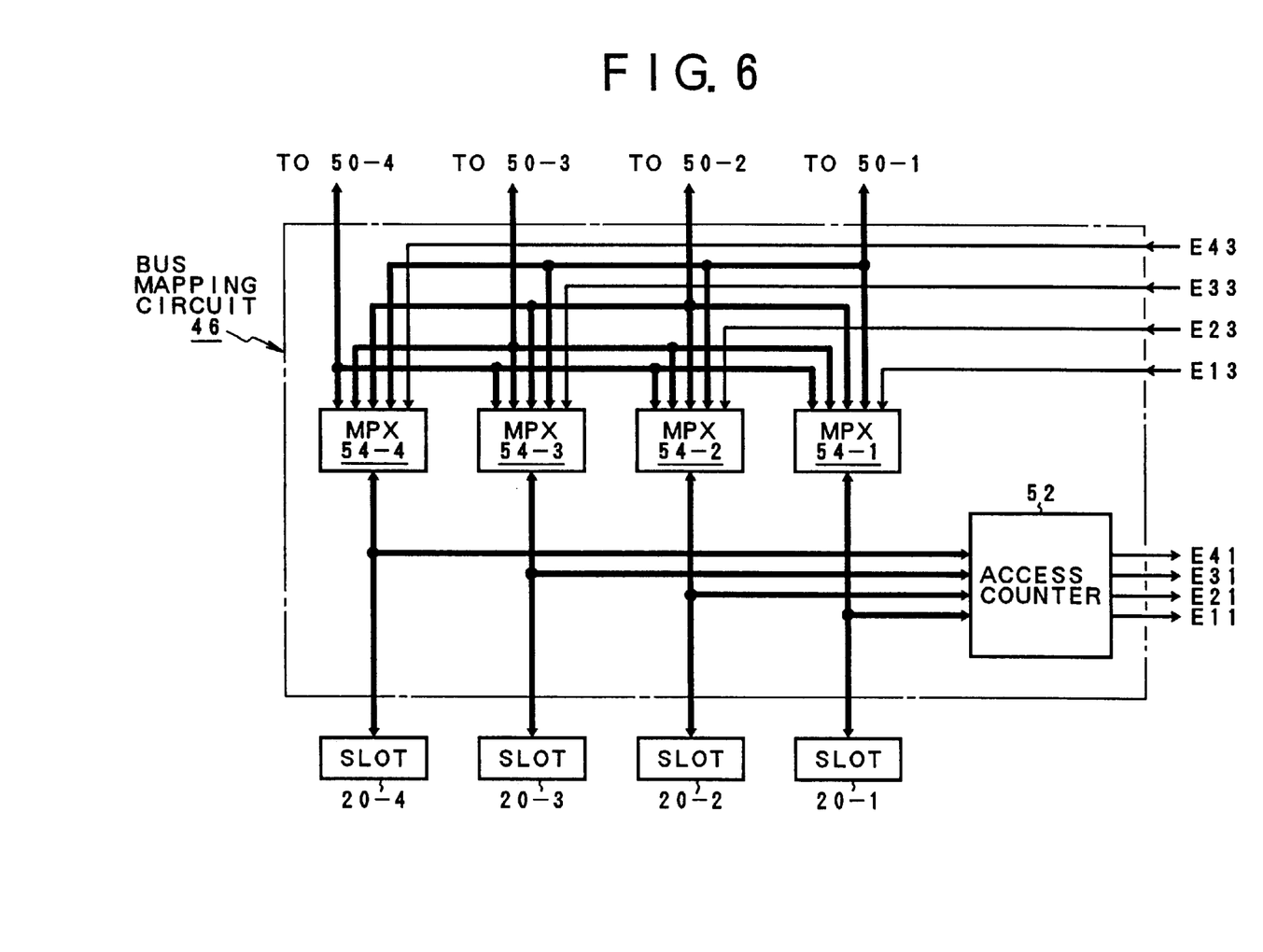
FIG. 6 is a circuit block diagram of a bus mapping circuit of FIG. 5.

FIG. 6 is a circuit block diagram of the bus mapping circuit 46 of FIG. 5. The bus mapping circuit is provided with an access counter 52 and four multiplexers 54-1 to 54-4. The access counter 52 connects the buses of the slots 20-1 to 20-4, counts up the number of accesses of the host computer 10, and sets the logical level of the bus arbitration signals E11 to E41 to 1 when the access number is equal to or more than a threshold value but to 0 when it is less than the threshold value. The multiplexers 54-1 to 54-4 are provided in such a manner as to correspond to the slots 20-1 to 20-4, respectively, and each connect to the buses associated with the slots 20-1 to 20-4 and connect to the slot connection positions 50-1 to 50-4 of the bus 16, allowing the slots 20-1 to 20-4 to be selectively connected to the four slot connection positions 50-1 to 50-4. For this reason, the bus mapping signals E13 to E43 are imparted from the priority decision circuit 48 to the multiplexers 54-1 to 54-4, respectively. These bus mapping signals E13 to E43 are provided in the form of 2-bit signals since they switch the connections of four slot connection positions 50-1 to 50-4 on the bus 16 with respect to the slots 20-1 to 20-4. More specifically, the bus mapping signals E13 to E43 each select the slot connection position 50-1 having the highest priority when 00, select the slot connection position 50-2 having the second highest priority when 01, select the slot connection position 50-3 having the third highest priority when 10, and select the slot connection position 50-4 having the lowest priority when 11.

Figure 7:
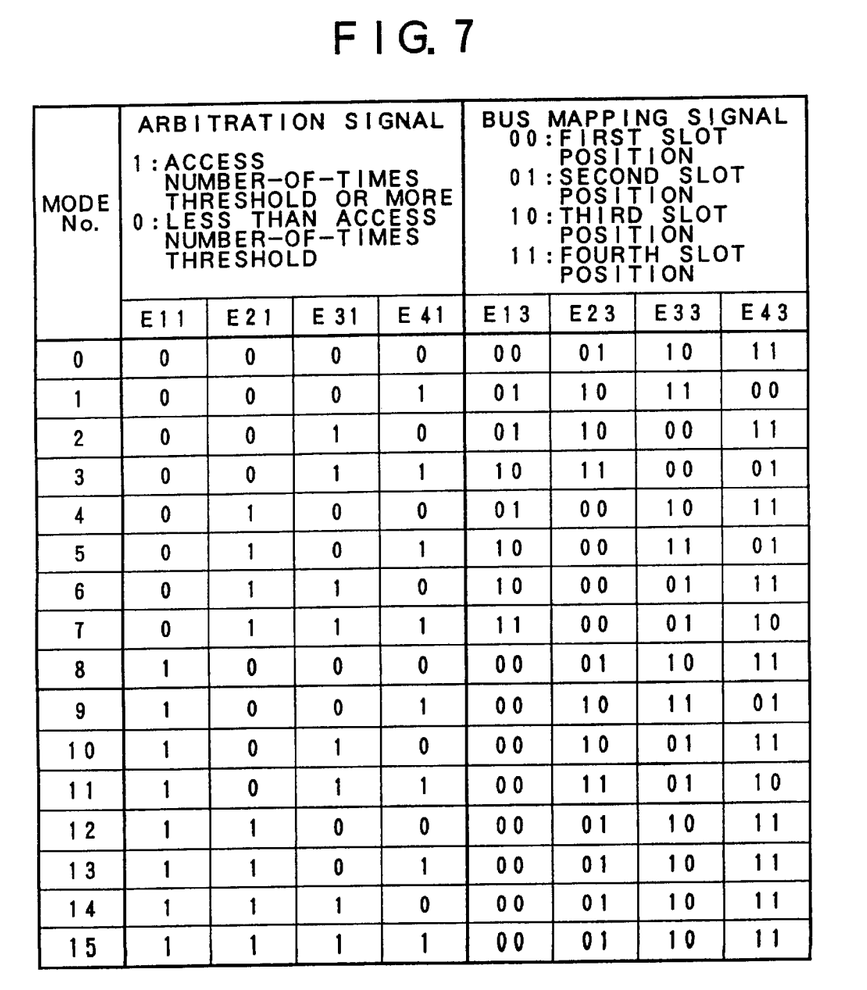
FIG. 7 is an explanatory diagram of a bus mapping signal to be fed in response to the input of an arbitration signal indicative of the access frequency in a priority decision circuit of FIG. 6.

FIG. 7 is a logical table for use in the priority decision circuit 48 of FIG. 5. This logical table is used for inputting 4-bit information of the bus arbitration signals E11 to E43 from the access counter 52 provided in the bus mapping circuit 46 of FIG. 6 to issue the bus mapping signals E13 to E43 having 2-bit information to the multiplexers 54-1 to 54-4 of the bus mapping circuit 46 of FIG. 6, thereby providing a control of the state of connection of the slots 20-1 to 20-4 to the four slot connection positions 50-1 to 50-4. Since the arbitration signals E11 to E14 are four bits in this manner, there exist 16 modes including the mode Nos. 0 to 15. Mode No. 0 represents an initial state in which the number of times of access to all the slots 20-1 to 20-4 is less than a threshold value, and hence it defines the default logical relationship. At that time, the bus mapping signal E13 is 00, allowing the slot 20-1 to be connected to the slot connection position 50-1 having the highest priority. The bus mapping signal E23 results in 01, allowing the slot 20-2 to be connected by the multiplexer 54-2 to the slot connection position 50-2 having the second highest priority. The bus mapping signal E33 imparted to the multiplexer 54-3 results in 10, allowing the slot 20-3 to be connected to the slot connection position 50-3 having the third priority. Furthermore, the bus mapping signal E43 imparted to the multiplexer 54-4 results in 11, allowing the slot 20-4 to be connected to the slot connection position 50-4 having the lowest priority. The apparatus is started in the initial state representing the default logical patterns and the access number of times over a specified period of time is counted up, so that the mode of the four-bit arbitration signal changes from the mode No. 0 to any one of the mode Nos. 1 to 15. It is natural that the mode No. 0 may possibly be unvaried. It is assumed in this case that the number of times of access to the slot 20-4 connected to the slot connection position 50-4 having the lowest priority became equal to or more than a threshold value to change the logical level of the arbitration signal E14 to 1. In response to the change of the logical level of the arbitration signals E11 to E14 into 0001, the bus mapping signal E43 imparted to the multiplexer 54-4 corresponding to the slot 20-4 having the largest access number of times results in 00, allowing a selection of a connection to the slot connection position 50-4 having the highest priority. At the same time, the bus mapping signals E13, E23 and E33 imparted to the multiplexers 54-1 to 54-3 corresponding to the slots 20-1 to 20-3 result in 01, 10 and 11, respectively, allowing the connections to the slot connection positions 50-2, 50-3 and 50-4 which are each shifted by one since the slot 20-4 is connected to the slot connection position 50-1. As a result of this, the slot 20-4 having the largest access number of times is connected to the slot connection position 50-1 having the highest priority whereas the slots 20-1, 20-2 and 20-3 receiving unvarying arbitration signals are connected to the slot connection positions 50-2, 50-3 and 50-4, respectively, having priorities lowered by one. From there onward as well, every specified period of time there is dynamically effected switching of the connections of the slots 20-1 to 20-4 to the slot connection positions 50-1 to 50-4 on the bus 16 by the bus mapping signal corresponding to the arbitration signal having any one of the mode Nos. 0 to 15, on the basis of the comparison of the result of counting of the access number of times with the threshold value.

According to the present invention as described hereinabove, the priorities are determined on the basis of the frequencies of access to a plurality of slots, and a mapping is effected so as to connect the slot having a higher priority to the upper hierarchical bus but to connect the slot having a lower priority to the lower hierarchical bus whereby in-case there exist a slot having no access of the upper hierarchical bus, a slot having less access number of times and an idle slot, a bus mapping is effected for connecting the slot of the lower hierarchical bus having more access number of times to a slot of the upper hierarchical bus when there exists a frequently accessed lower slot, with the result that there is no access via the bus bridge to the slot having more access number of times to shorten the access path, thereby increasing the speed of bus access to the frequently accessed slot to improve the access properties as a whole.

Moreover, in compliance with the electrical characteristics of the slot connection positions, priorities are assigned to a plurality of slots connected to a single bus, and a mapping is effected so that a slot having a higher access frequency is connected to the slot position having a higher priority on the bus and that a slot having a lower access frequency is connected to the slot position having a lower priority on the bus, whereby the slot having more access number of times is mapped to the slot position having a satisfactory electric characteristic to improve the electric characteristic and shorten the delay time for example, thereby making it possible to increase the speed of bus access to the slot having more access number of times to improve the access properties as a whole.

It is to be appreciated that although in this embodiment two slots or four slots are connected to a single bus by way of example, the number of slots to be connected to the bus may be any appropriate number based on the bus architecture and that it is not limited by the embodiments. Although the hierarchical bus of FIG. 1 is two-hierarchical bus consisting of the upper hierarchical bus 16 and the lower hierarchical bus 18 by way of example, the number of hierarchy could appropriately be increased as needed.

Furthermore, although in the embodiments of FIG. 1 and FIG. 5 the bus mapping circuit and the priority decision circuit are implemented as logical circuits, they may naturally be implemented under the control of a software by means of a bus control processor. In addition, although in the above embodiments the number of times of access to each slot is compared with a threshold value to represent the access number of times by 2-bit information having high level and low level, direct use may be made of the access number of times itself.

It is to be construed that the present invention includes variants without impairing the objects and advantages thereof and that it is not limited by the numerical values shown in the embodiments.

What is claimed is:

1. A bus control apparatus comprising:
   a bus connected to a host apparatus by hierarchizing the bus to at least an upper hierarchical bus and a lower hierarchical bus;
   a plurality of slots selectively connectable to said bus in order to connect a device receiving an input/output demand from said host apparatus;
   a priority decision circuit for dynamically deciding priorities of said plurality of slots at specified time intervals; and
   a bus mapping circuit for mapping said plurality of slots so as to connect each slot having a high priority to said upper hierarchical bus and to connect each slot having a low priority to said lower hierarchical bus each time the priority of the plurality of slots is decided by said priority decision circuit.

2. A bus control apparatus according to claim 1, wherein positions of connections of said bus to said slots are assigned priorities set in the order of descending electric characteristics with said host apparatus, and wherein
   said bus mapping circuit connects each of plurality of slots to a position of connection having a predetermined priority on said bus on the basis of priorities.

3. A bus control apparatus according to claim 2, wherein said priority decision circuit decides the priorities on the basis of the frequencies of access of said host apparatus to devices connected to said plurality of slots.

4. A bus control apparatus according to claim 3, wherein said bus mapping circuit has an access counter which counts up the number of times of access of said host apparatus to the devices connected to said plurality of slots at a specified interval, and wherein
   said priority decision circuit sets priorities of said slots in descending order of access number of times counted up by said access counter.

5. A bus control apparatus according to claim 4, wherein at the start of the use of said apparatus by a power on, said priority decision circuit assigns previously defined priorities to said plurality of slots whereas, while in use, it priority decision circuit assigns the priorities to said slots in descending order of the number of times of access of said host apparatus to the devices connected to said plurality of slots which are counted up by said access counter at a specified interval.

6. A bus control apparatus according to claim 4, wherein said bus mapping circuit allows a non-volatile memory unit to store at the time of power off the priorities of said plurality of slots determined by said priority decision circuit, and wherein
   said bus mapping circuit reads out the priorities stored in said non-volatile memory unit at the start of use by the next power on, to thereby perform initialization.

7. A bus control apparatus according to claim 2, wherein when said priority decision circuit recognizes an unused slot which is not connected to the device among said plurality of slots, it assigns the lowest priority to said unused slot.

8. A bus control apparatus according to claim 2, wherein said bus mapping circuit performs mapping allowing a slot having a higher priority to be connected to a slot connection position having a higher priority whereas it performs mapping allowing a slot having a lower priority to be connected to a slot connection position having a lower priority.

9. A bus control apparatus for connecting a plurality of slots for the connection of devices receiving an input/output demand from a host apparatus to a bus connected to said host apparatus, said bus control apparatus comprising:
   a plurality of slot connecting positions which are provided for said bus and to which predetermined priorities have been assigned;
   a priority decision circuit for dynamically deciding priorities of said plurality of slots at every certain time interval; and
   a bus mapping circuit for selectively connecting each of said plurality of slots to said slot connecting position having said slot connecting position of the corresponding priority each time the priority of the slot is determined by said priority decision circuit.

10. A bus control apparatus according to claim 9, wherein said bus has a hierarchical structure;
   said plurality of slot connecting positions are provided for a predetermined hierarchical level of said bus; and
   said bus mapping circuit selectively connects each of said plurality of slots to said predetermined hierarchical level of said bus.

11. A bus control apparatus according to claim 9, wherein said slot connecting positions provided for said bus are assigned priorities set in the order of descending electric characteristics with said host apparatus, and wherein
   said bus mapping circuit connects each of plurality of slots to a slot connecting position having a predetermined priority on said bus on the basis of priorities.

12. A method of connecting a plurality of slots to a hierarchical bus, said hierarchical bus having an upper bus and a lower bus, for the connection of devices receiving access requests from a host apparatus, comprising:
   determining the priorities of each of the plurality of slots, based on the frequency of access of the host apparatus to devices connected to said each of the plurality of slots;

connecting each slot having a high priority to the upper bus; and connecting each slot having a low priority to the lower bus.

13. A method of connecting a plurality of slots to a bus for the connection of devices receiving access requests from a host apparatus, comprising:

assigning predetermined priorities to a plurality of slot connecting positions;

dynamically determining the priorities of the plurality of slots at every certain time interval; and selectively connecting each slot of the plurality of slots to said slot connecting position having said slot connecting position of the corresponding priority each time the priority of the slot is determined.

14. A method of connecting a plurality of slots to a bus, comprising:

hierarchizing the bus to at least an upper hierarchical bus and a lower hierarchical bus;

dynamically deciding priorities of said plurality of slots at specified time intervals; and mapping the plurality of slots, wherein each slot having a high priority is connected to said upper hierarchical bus and each slot having a low priority is connected to said lower hierarchical bus each time the priority of the plurality of slots is dynamically decided.

15. A bus control apparatus, comprising:

means for hierarchizing a bus to at least an upper hierarchical bus and a lower hierarchical bus;

means for selectively connecting a plurality of slots to said bus in order to connect a device receiving an input/output demand from a host;

means for dynamically deciding priorities of said plurality of slots at specified time intervals; and means for mapping said plurality of slots so as to connect each slot having a high priority to said upper hierarchical bus and to connect each slot having a low priority to said lower hierarchical bus each time the priority of the plurality of slots is decided.

* * * * *